(12) United States Patent
Buskey et al.

(10) Patent No.: US 8,311,214 B2
(45) Date of Patent: Nov. 13, 2012

(54) METHOD FOR ELLIPTIC CURVE PUBLIC KEY CRYPTOGRAPHIC VALIDATION

(75) Inventors: Ronald F. Buskey, Sleepy Hollow, IL (US); Barbara B. Frosik, Arlington Heights, IL (US); Douglas A. Kuhlman, Inverness, IL (US)

(73) Assignee: Motorola Mobility LLC, Libertyville, IL (US)

( * ) Notice: Subject to any disclaimer, the term of this patent is extended or adjusted under 35 U.S.C. 154(b) by 1631 days.

(21) Appl. No.: 11/379,815

(22) Filed: Apr. 24, 2006

(65) Prior Publication Data

US 2007/0248224 A1    Oct. 25, 2007

(51) Int. Cl.
*H04K 1/00* (2006.01)
*H04L 9/00* (2006.01)
*H04L 9/30* (2006.01)

(52) U.S. Cl. .............. 380/30; 235/386; 380/29; 380/37; 380/44; 380/46; 380/47; 380/255; 380/277; 380/278; 380/279; 380/280; 380/281; 380/283; 380/285; 713/155; 713/168; 713/169; 713/176; 713/171; 705/73

(58) Field of Classification Search .................... 713/168
See application file for complete search history.

(56) References Cited

U.S. PATENT DOCUMENTS

| | | | |
|---|---|---|---|
| 5,159,632 A | 10/1992 | Crandall | |
| 5,271,061 A | 12/1993 | Crandall | |
| 5,463,690 A | 10/1995 | Crandall | |
| 6,141,420 A | 10/2000 | Vanstone et al. | |
| 6,618,483 B1 | 9/2003 | Vanstone et al. | |
| 7,298,839 B2 * | 11/2007 | Eisentraeger et al. | 380/30 |
| 2003/0081785 A1 * | 5/2003 | Boneh et al. | 380/277 |
| 2004/0005054 A1 * | 1/2004 | Montgomery et al. | 380/30 |
| 2004/0073801 A1 | 4/2004 | Kalogridis et al. | |
| 2005/0025316 A1 | 2/2005 | Pelly et al. | |
| 2005/0195973 A1 | 9/2005 | Ibrahim | |
| 2006/0165231 A1 * | 7/2006 | Srungaram | 380/30 |

OTHER PUBLICATIONS

Patent Cooperation Treaty, "Notification of Transmittal of the International Search Report and the Written Opinion of the International Searching Authority, or the Declaration", PCT/US2007/65588, Feb. 5, 2008, pp. 1-9, Alexandria, Virginia.

* cited by examiner

*Primary Examiner* — Nathan Flynn
*Assistant Examiner* — Bryan Wright

(57) ABSTRACT

Communication and validation of information transfer from a transmitter to a receiver is achieved by generating a cipher (400) from a message m (410) using parameters of an elliptic curve, a generator point P (406) on the elliptic curve and a public key Q (416) of the receiver. The cipher includes a first element that is the product kP of a random number k (404) with the generator point P and a second element that is the product of m and the x-coordinate of the product kQ. The message m is generated from two mathematically independent representations of the information and, optionally, a random number. The cipher is communicated to the receiver and decoded to recover a message m' (502). A validation token (500) is generated by the receiver and passed to the transmitter, which validates communication of the information to the receiver if the product mkQ is equal to the validation token.

21 Claims, 5 Drawing Sheets

METHOD FOR ELLIPTIC CURVE PUBLIC KEY CRYPTOGRAPHIC VALIDATION

CROSS REFERENCE TO RELATED APPLICATIONS

This application is related to co-pending application, entitled "Encryption And Verification Using Partial Public Key", having U.S. patent application Ser. No. 11/276,680, and which was filed on Mar. 9, 2006.

BACKGROUND

Network node devices with limited resources often need to authenticate an external device, such as a network server, to perform a critical function. For example, a node device may want to provide private data, such as a measurement, location or ID information, to a system that is authorized to receive it.

One prior approach provides a node with a method to seek permission from an authority, or trusted controller, within a network. For example, the node may create a unique message and send that message to the trusted controller for the system, where the controller might sign the unique message and return it to the node. When the node verifies the signature for the message it can continue assuming it was granted authority by the trusted controller.

Also known are algorithms for controlling different levels of access (or permissions) on the host entity. Each level is related to a private-public key pair. The ability to offer multiple access levels with a single key offers an advantage in limiting the storage of multiple keys on an embedded system.

Also known are solutions that use communication protocols where the device encrypts the challenge message and the server calculates a digital signature and returns it to the device. This approach requires the device to support multiple mathematical functions, including elliptic curve point multiplications and finite field inversions. An additional approach encrypts a challenge message which is restricted to contain a random component plus the message. The server can decrypt the message and return the random part of the challenge message unencrypted. This approach resolves the simplicity issue, but then the level of security is compromised if the system needs a large percentage of the message to be the private information rather than a random value.

It is well known that data can be encrypted and then decrypted by utilizing a pair of keys, one of which is public and one of which is private. The keys are mathematically related such that data encrypted using the public key can be decrypted using the private key. It is also well known that a signature created with the private key can be verified utilizing the public key, and that anyone without the private key cannot generate a signature that will be validated.

The most well-known public key cryptosystems are those based on integer factorization and discrete logarithms in finite groups. It is also well known that by using computations in an elliptic curve defined over a finite field rather than a RSA cryptosystem, it is possible to achieve an increased security level for the same key size or, conversely, the same security level for a shorter key compared with the RSA cryptosystem.

Thus, elliptic curve encryption schemes are very suitable for the embedded environment, as the key sizes are much smaller than in the widely-used RSA schemes and require less memory.

In an elliptic curve based, public-key encryption scheme, there are a number of system parameters that must be shared by all participants in order to make the scheme work. The set of system parameters typically consists of the definitional terms of the elliptic curve to be used, as well as a designated generator point P, represented by x- and y-coordinates, known as affine coordinates. The elliptic curve defining parameters are typically designated a and b, where the group of points on the elliptic curve is defined by the group $E_p(a,b)$ for which $y^2 = x^3 + ax + b$, modulo p or the group $E_{2^m}(a,b)$ for which $y^2 + xy = x^3 + ax^2 + b$, modulo $2^m$. The parameter p or m (which defines the finite field of definition) is also part of the set of system parameters. The elliptic curve may also be defined in terms of projective coordinates X, Y and Z. The curves are then defined by the group $E_p(a,b)$ for which $$Y^2 Z = X^3 + aXZ^2 + bZ^3, \text{ modulo } p,$$

or the group $E_{2^m}(a,b)$ for which $$Y^2 Z + XYZ = X^3 + aX^2 Z + bZ^3, \text{ modulo } 2^m.$$

The affine and projective coordinates are related by $x = X/Z$ and $y = Y/Z$.

BRIEF DESCRIPTION OF THE DRAWINGS

The novel features believed characteristic of the invention are set forth in the appended claims. The invention itself, however, as well as the preferred mode of use, and further objects and advantages thereof, will best be understood by reference to the following detailed description of an illustrative embodiment when read in conjunction with the accompanying drawing(s), wherein:

DETAILED DESCRIPTION

Figure 1:
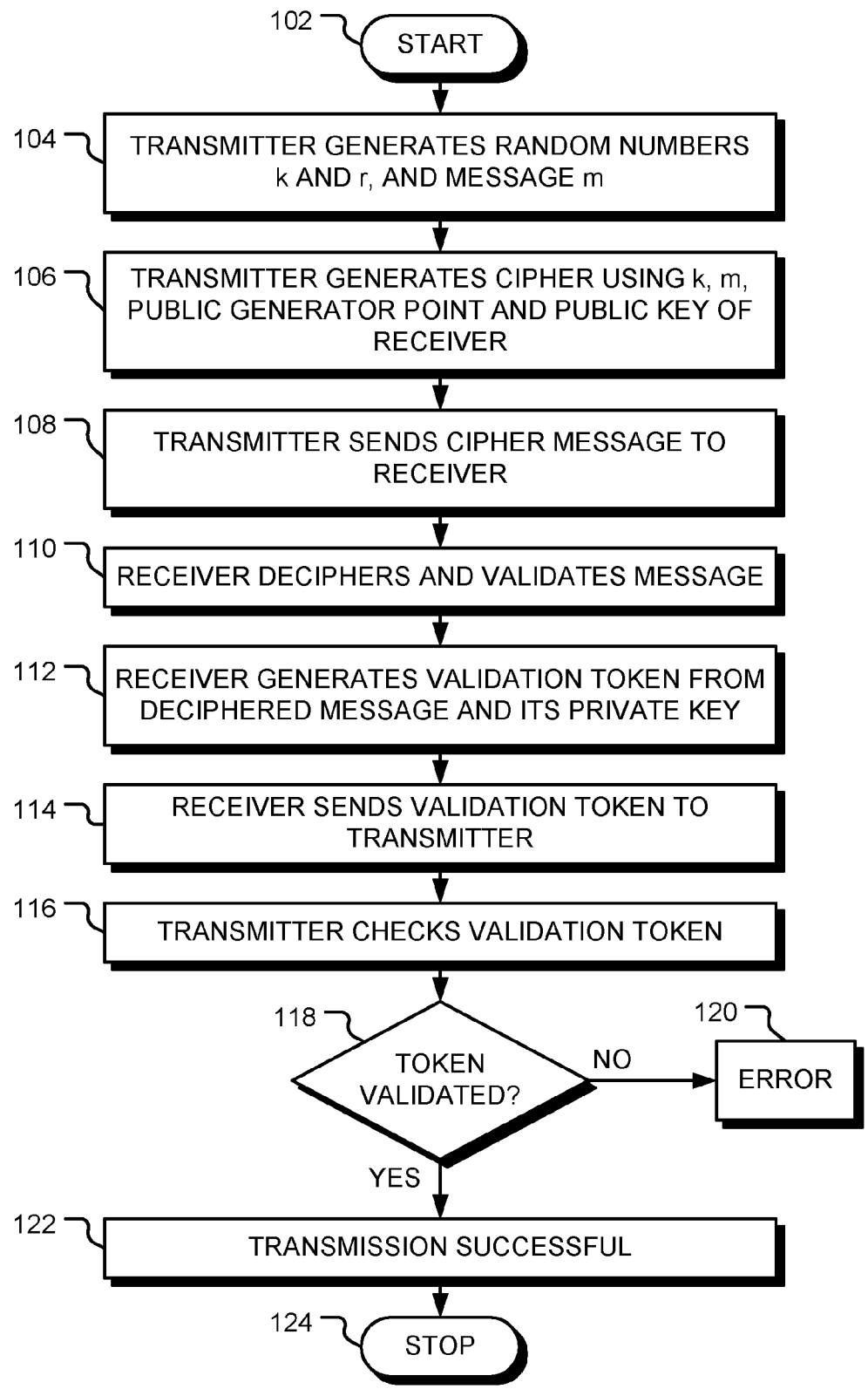
FIG. 1 is a flow chart of a method consistent with certain embodiments of the invention.

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the description below, like reference numerals are used to describe the same, similar or corresponding parts in the several views of the drawings.

One aspect of the present invention relates to a method for a node device of a network to share private data with an external device, such as a remote server on the network, and to validate receipt of the data. In accordance with one embodiment, the node device (hereafter sometimes referred to as the 'transmitter') generates a message using the data to be shared. It then uses elliptic curve encryption to build a challenge for the remote server and sends that challenge to the remote server. The remote server (hereafter sometimes referred to as the 'receiver') is only able to decrypt the challenge and retrieve the message if it has the matching private key. The receiver then generates a validation token using the original message and elliptic curve operations with the private key, and sends the validation token back to the device. The device can then validate that the original private data has been successfully returned. The transmitter and receivers are typically portions of wireless electronic devices. An electronic device that comprises the transmitter may, for example, be a small, low power radio frequency sensor of the type used in ad hoc radio frequency networks, of which one example is a Zigbee® network. In another example, an electronic device that comprises the transmitter may be a Bluetooth equipped radio frequency equipment controller.

FIG. 1 is a flow chart of a method consistent with certain embodiments. The method relates to two logically separated entities, one with a public key (this entity is called the 'transmitter'), and the other with the corresponding private key (the 'receiver'). Following start block 102 in FIG. 1, the transmitter generates two random numbers, k and r, at block 104. Also at block 104, the transmitter generates a message m that contains message identifiers, information, i, and a random number, r. At block 106, the transmitter generates a cipher c from the random number k, a public generator point P, the message m, and a public key Q of the receiver. The cipher message c also acts as a challenge to the receiver. At block 108, the transmitter sends the cipher message to the receiver. At block 110, the receiver deciphers the cipher message to recover the message m'. The message m' will be equal to the original message m, provided that the receiver has knowledge of the private key, q that corresponds to the public key Q. The receiver may also validate the information if validation information is included in the cipher message. At block 112 the receiver generates a validation token from the deciphered message m', its own private key q, and the first portion of the cipher kP. At block 114, the transmitter sends the validation token to the transmitter and, at block 116, the transmitter checks the validation token. If the token is not validated, as depicted by the negative branch from decision block 118, an error has occurred in the transmission and an error is flagged at block 120. If the token is validated, as depicted by the positive branch from decision block 118, the success of the transmission is flagged at block 122 and it is verified that the data has been received by an authenticated receiver. The process terminates at block 124.

This process can be used in sensor network type systems to send sensitive data to a trusted server and to verify that the server received the data. In addition, the process can be used as a control. For example, the node device will transmit the private information until it receives this validation token and then stop sending to either save power or use the smallest amount of radio frequency (RF) energy. The process requires limited processing and memory requirements on the device, but still provides strong cryptographic protection for the information for those cases where the amount of random data is too small to be cryptographically significant.

The encryption and validation process described below is based on elliptic curve arithmetic and a public-private key scheme. This guarantees that the information related to the protected function on device that was requested is conveyed to the server and cannot be tampered with by an intermediary. It also provides cryptographically strong challenge-response based verification, while limiting the mathematical functions required to be used by the node.

The method begins with an elliptic curve encryption process, during which a message m containing the information i and random value r is encrypted by a transmitting party. The message is decrypted by a receiving party. Various elliptic curve encryption processes are known to those of ordinary skill in the art. Consistent with an embodiment of the present invention, the receiving party validates the decrypted message m' and, if validated positively, creates a validation token by scalar multiplication of decrypted message m' and a point on elliptic curve known only by transmitter and receiver. This shared point (qkP or kqP, for example) exists after the two parties exchange data via the elliptic curve algorithm. It is well known that the response can be constructed by utilizing the plaintext message or random part of it. The present method does not reveal the plaintext message and thus it is useful to protect the information that was sent in the challenge message from being leaked from the system for those cases where the length of the information would not allow for a cryptography significant random value to be used for the response. The receiver communicates the validation token as a response to the transmitter. The transmitter, in turn, validates the response by scalar multiplication of that known point and the message m.

In one embodiment, projective coordinates in the elliptic curve arithmetic are used. The use of projective coordinates for elliptic curve arithmetic is known to those of ordinary skill in the art. This embodiment is well suited for applications in which the transmitter is an embedded device with very limited resources. The use of projective coordinates allows the transmitter to perform finite field addition and multiplication algorithms without a computationally expensive finite field inversion operation. Only the receiver, which generally possesses more computing power, is required to perform a finite field inversion operation.

This approach may be used to support security architecture technology that can be applied to processors used for ad hoc and sensor networks and provides a way for private and sensitive information to be sent to a receiver and allows the transmitter to authenticate the receiving of that information without leaking any sensitive information.

The use of a validation token, rather than a digital signature, only requires the resource limited device to be able to perform a small set of major mathematical operations (rather than multiple mathematical operations).

In general the method involves two logically separated entities, one with the public key, and the other with the private key. Party A with a public key has information i that needs to be validated (or processed into a yes/no result). The information i can represent anything—data, function, access, etc. Party B with the private key possesses the power to validate the information i. The method described herein provides a secure method of delegating the processing to a logically separated entity. The trusted entity, party B, owns a private key q, which is a number between 0 and the order of the elliptic curve. The party A, which delegates processing to party B, owns public key $\{P, Q\}$ that consists of the generator point P on the elliptic curve (defined over the groups $E_p$ or $E_{2^m}$, for example) and point Q=qP, which is the scalar multiplication of the generator point P by the private key q.

Figure 2:
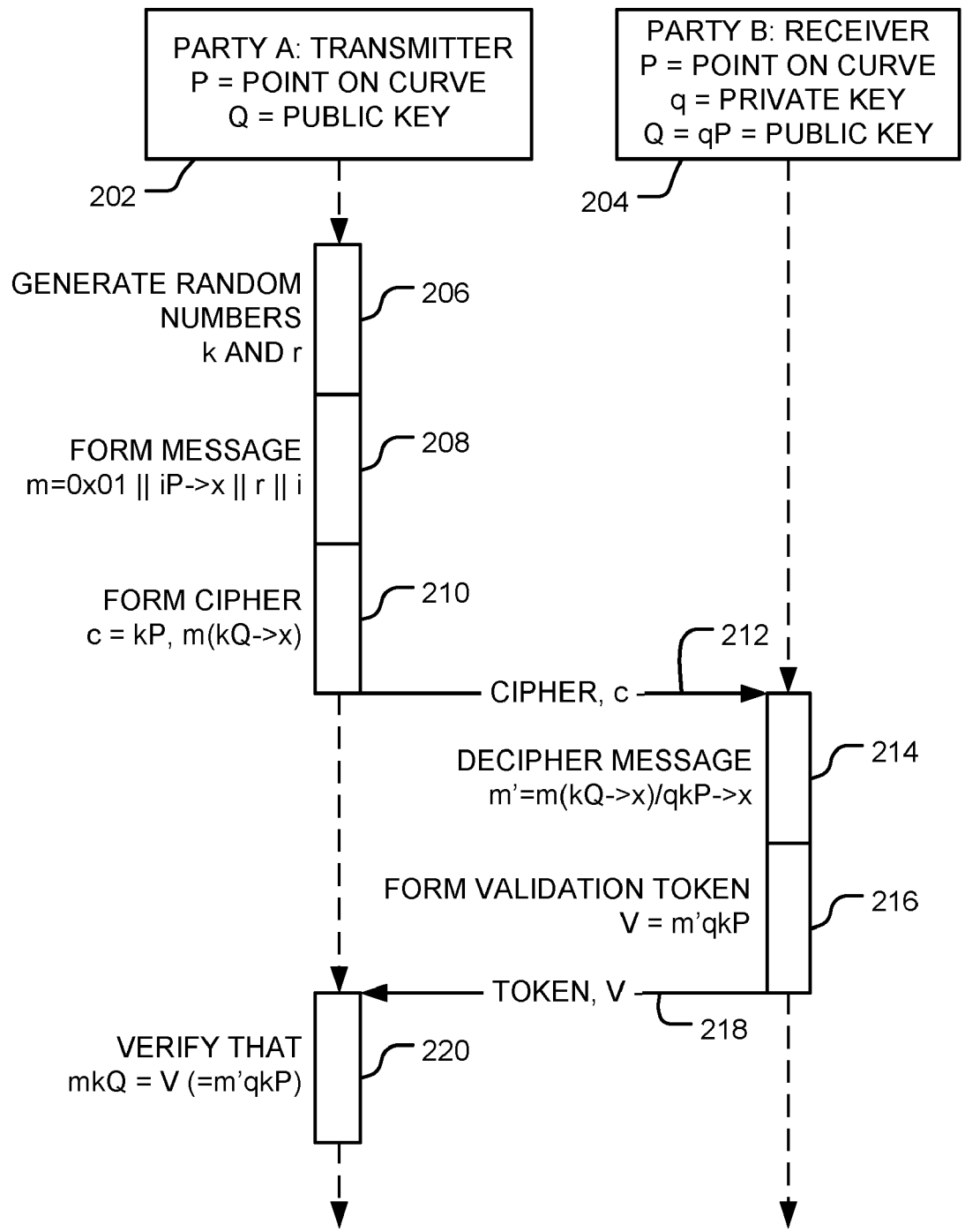
FIG. 2 is sequence diagram of a method consistent with certain embodiments of the invention.

FIG. 2 is sequence diagram of a method consistent with certain embodiments of the invention. This method uses affine coordinates in the elliptic curve arithmetic. Referring to FIG. 2, the transmitter 202 (party A) has the information i, together with the system parameters of the elliptic curve (the values a and b for example, and a generator point P) and a public key Q of the receiver 204 (party B). The receiver 204 (party B) has the system parameters of the elliptic curve (the values a and b for example, and a generator point P) and a private key q. The process is as follows.

a. At 206, party A generates random numbers k and r.
 b. At 208, party A transforms information i into a message m. In the figure, '||' denotes concatenation. In this embodiment, the message m is limited to the size of the finite field by including the 0x01 prefix to the message.

This prevents overflow of future operations. The message includes two, arithmetically independent, representations of the information. This can be, for example, the information itself and a scrambled version of the information. Scrambling may be achieved using known techniques such as an 'exclusive OR' operation or multiplication with a point on an elliptic curve. Optionally, the message may be padded with random data, r. This is particularly useful when the information is predictable or limited in scope. The random data may comprise more than half of the message.

c. At 210, party A encrypts the message m using elliptic curve encryption. The cipher message c=E(m) is generated consisting of the x and y coordinates of a point R=kP (this point is obtained by scalar multiplication of random number k by the generator point P) and the message m multiplied by the x coordinate of point T=kQ (the point obtained by scalar multiplication of random number k by the point Q). In this embodiment, affine coordinates are used.

d. At 212, the cipher message c is communicated to the party B (the receiver). In addition to passing information, the cipher message c provides a challenge that is communicated to party B (the receiver). In some embodiments, party A may additionally communicate credentials.

e. At 214, party B decrypts the cipher message to get the message m' and, optionally, validates the information i using the two arithmetically independent representations that were included in the message. In some embodiments the information i is additionally validated against a set of predetermined values. Party A may also have provided credentials which authorize them to process the information i. In essence, the credentials help party B to determine the set of acceptable values of i. A point T is calculated by scalar multiplication of a private key q, and the point R (included in the cipher). It is noted that T=qR=qkP=kQ. The message m' is recovered by multiplying the inverse x-coordinate of point T and the numeric part of challenge.

f. If the result of the processing is successful, party B creates a validation token V at 216, where V is a point obtained by scalar multiplication of the message m' and point T. The point V is a response validation token to the challenge c.

g. At 218, the response validation token V is communicated to party A.

h. At 220, party A, which has both the message m and the point T, validates the response. The validation checks for equality of received point V and point obtained by a scalar multiplication of m and point T.

Figure 3:
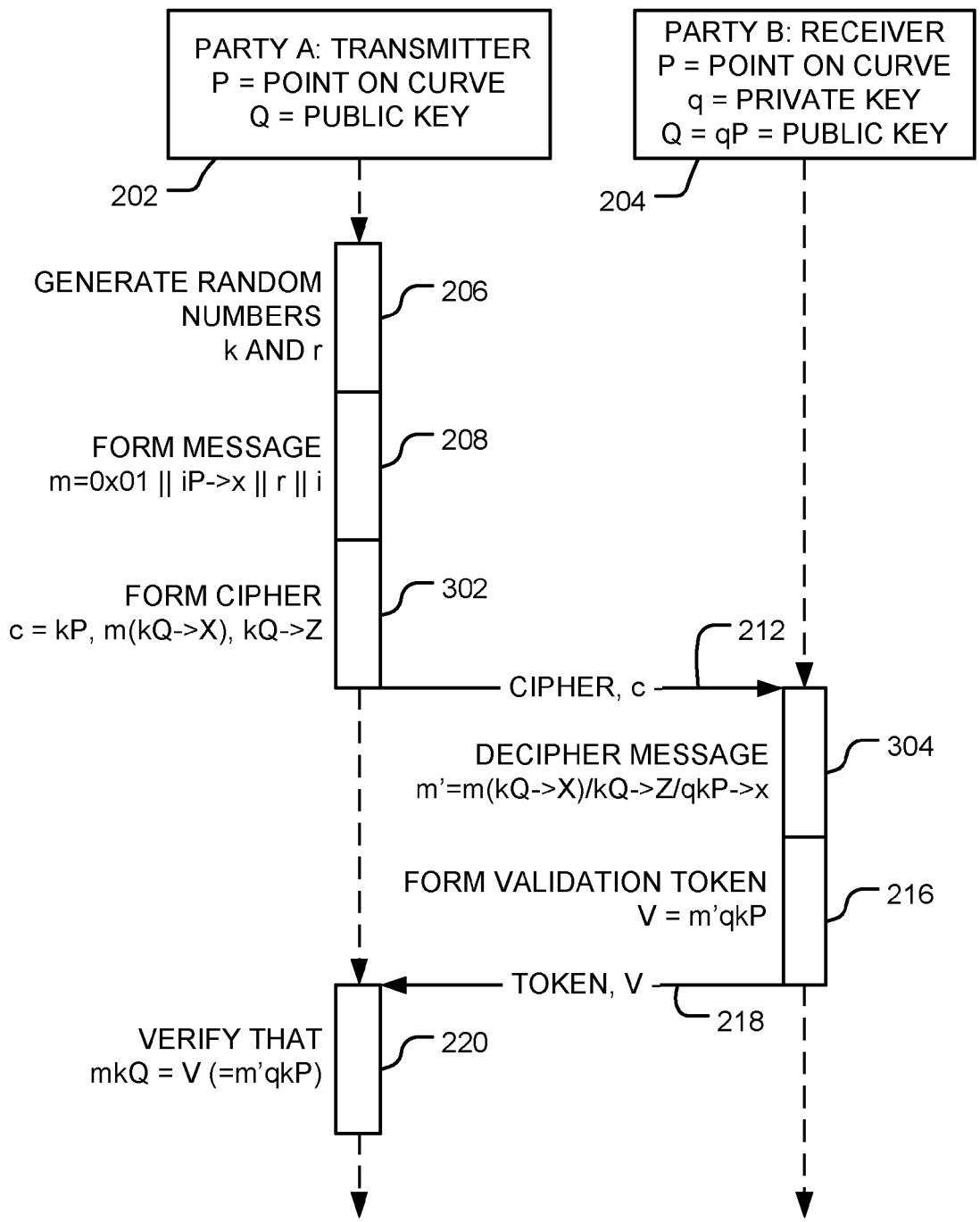
FIG. 3 is sequence diagram of a further method consistent with certain embodiments of the invention.

FIG. 3 is sequence diagram of a further method consistent with certain embodiments of the invention. This method uses projective coordinates in the elliptic curve arithmetic. This embodiment of the process requires limited computational resources and is suitable for use in a system in which the party A with a public key is an embedded device with very limited resources. Use of projective coordinates allows party A to avoid a costly finite field inversion operation. The inversion is delegated to party B, which may possess greater computing power. Referring to FIG. 2, the transmitter 202 (party A) has the information i, together with the system parameters of the elliptic curve (the values a and b for example, and a generator point P) and a public key Q of the receiver 204 (party B). The receiver 204 (party B) has the system parameters of the elliptic curve (the values a and b for example, and a generator point P) and a private key q. The process is as follows:

a. At 206, party A generates random numbers k and r.

b. At 208, party A transforms information i into a message m by padding with random data, r. In the figure, '∥' denotes concatenation. The message m is limited to the size of the finite field. This is done in this embodiment by using the 0x01 prefix to the message. The message includes two, arithmetically independent, representations of the information.

c. At 302, party A encrypts the message m using elliptic curve encryption. The cipher message c=E(m) comprises the X, Y and Z projective coordinates of a point R=kP (a point obtained by scalar multiplication of a random number k by the generator point P) and the message m multiplied by the x coordinate (kQ→X) of the point T=kQ (a point obtained by scalar multiplication of a random number k by the point Q) as well as the Z coordinate of the point T.

d. At 212, the cipher message c is communicated to the party B (the receiver). In some embodiments, party A may additionally communicate credentials.

e. At 304, party B decrypts the message m' and, optionally, validates the information i using the two arithmetically independent representations of the information that were included in the message. In some embodiments the information i is additionally validated against a set of predetermined values. Party A may also have provided credentials which authorize them to process the information i. In essence, the credentials help party B to determine the set of acceptable values of i. A point T=qkP=kQ is calculated by scalar multiplication of party B's private key q, and the point R=kP (which is included in the cipher). The message m' is recovered using projective or affine coordinate arithmetic. For example, the cipher may be multiplied by the inverse of the Z-coordinate of kQ to give the (affine) x-coordinate of kQ=kqP and then multiplied by the (affine) inverse x-coordinate of point T=qkP to give the message, m'.

f. If the result of the processing is successful, party B creates a validation token V at 216, where V is a point obtained by scalar multiplication of m' and point T. The point V, in affine coordinates, is a response validation token to the challenge c.

g. At 218, the response validation token V is communicated to party A.

h. At 220, party A, which has both the message m and the point T, validates the response. The validation checks for equality of received point V and point obtained by a scalar multiplication of m and point T. The received point V is in affine coordinates, where the point calculated by mT is in projective coordinates. In order to compare without inversion, the affine x- and y-coordinates of the point V are multiplied by the Z-coordinate of the calculated point and compared to the projective X- and Y-coordinates of the point calculated by mT, respectively.

This validation method reduces the processing and resource requirements of the device by eliminating required complex mathematical steps and storage of multiple public keys. The validation method also allows the transmitter to continue sending information until receipt is confirmed.

Some of the prior approaches require the transmitter to perform a public key encryption of a random value and send it to the receiver. The receiver then uses the private key to decrypt the random value and performs a signature operation on that message and returns it to the device, or potentially returns just the decrypted random value to the device. These prior methods would require the device to perform at least two major types of finite field mathematical calculations (finite field multiplication and finite field inversion) or would place the private data sent from the device to the server in the clear as part of the return method. By using the validation token together with validation by the transmitter, the same level of security can be accomplished with only projective point multiplication required in the transmitter (which does not require finite field inversion). This approach protects the private data from being leaked from the system. For resource-limited transmitter devices, such as hardware access control blocks or sensor devices, this can be a significant improvement in performance.

Figure 4:
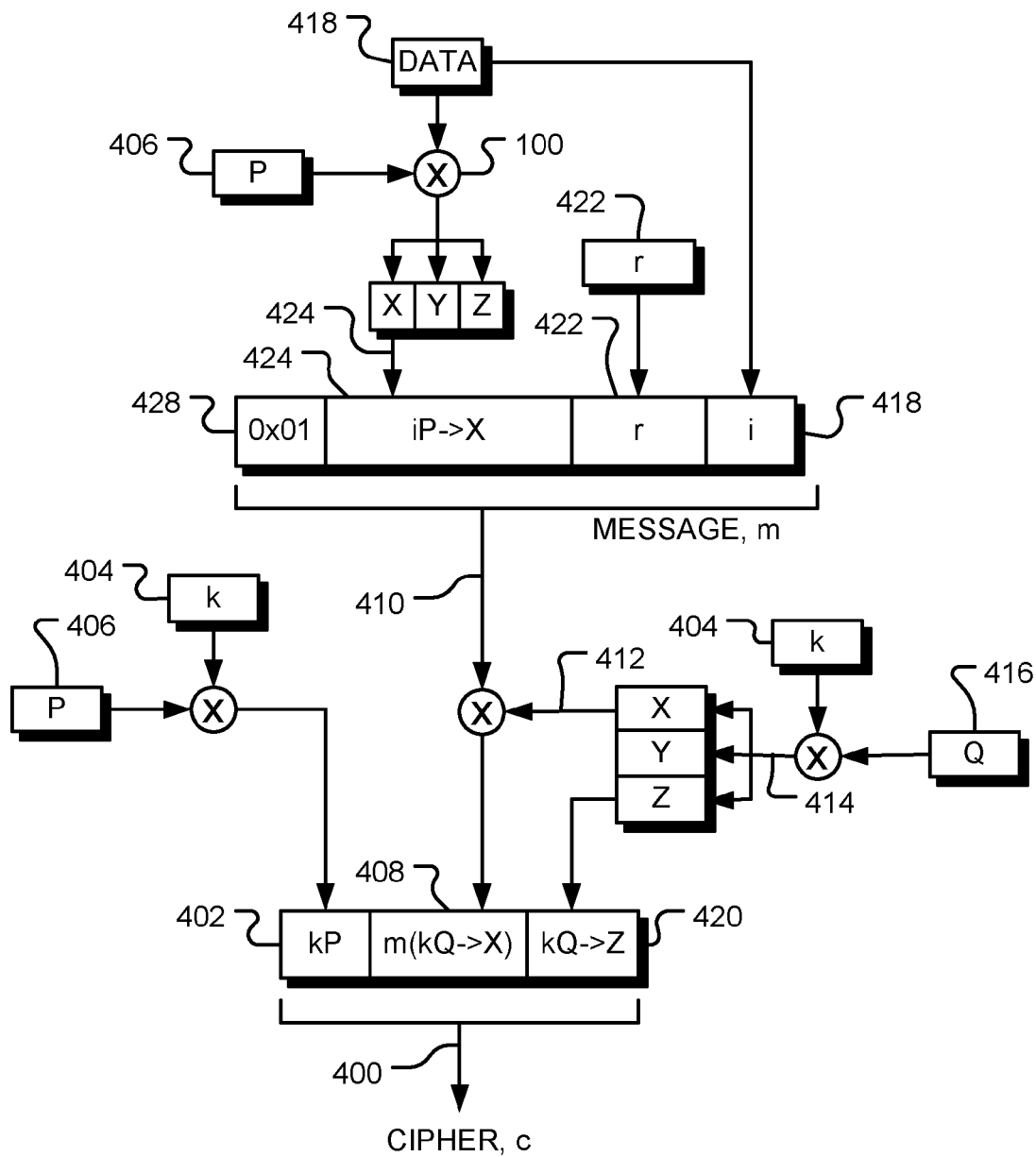
FIG. 4 is diagram showing generation of a cipher, c, consistent with certain embodiments of the invention, for transmission and validation of information from a transmitter to a receiver.

FIG. 4 is diagram showing generation of a cipher, c, consistent with certain embodiments of the invention, for transmission and validation of information from a transmitter to a receiver. The cipher 400 includes a first element 402 that is equal to a product kP of a first random number k (404) with a point P (406) on an elliptic curve and a second element 408 equal to a product m(kQ→x) of a message m (410) with the x-coordinate 412 of a point kQ (414) on the elliptic curve. The point Q (416) is a public key of the receiver and is a point on the elliptic curve. The message m (410) is dependent upon the information or data 418 to be transmitted. The x-coordinate of the point kQ may be an affine coordinate or a projective coordinate. If projective coordinates are used, as depicted in FIG. 4, the cipher 400 also includes the projective Z-coordinate 420 of the point kQ (414).

The message m (410) begins with a fixed message header to prevent overflow, it includes a second random number, r (422), the X-coordinate iP→X (424) and the information i 418 to be transmitted. The projective X-coordinate iP→X (424) can be generated on the receiver side by using the identical algorithm or other system constraints so that the Z coordinate does not have to be transmitted in the message. In some embodiments the projective value iP→X may equivalently be replaced by the affine x-coordinate of iP. The message 410 may be padded, with additional random bits 428 to make it a specified length.

Figure 5:
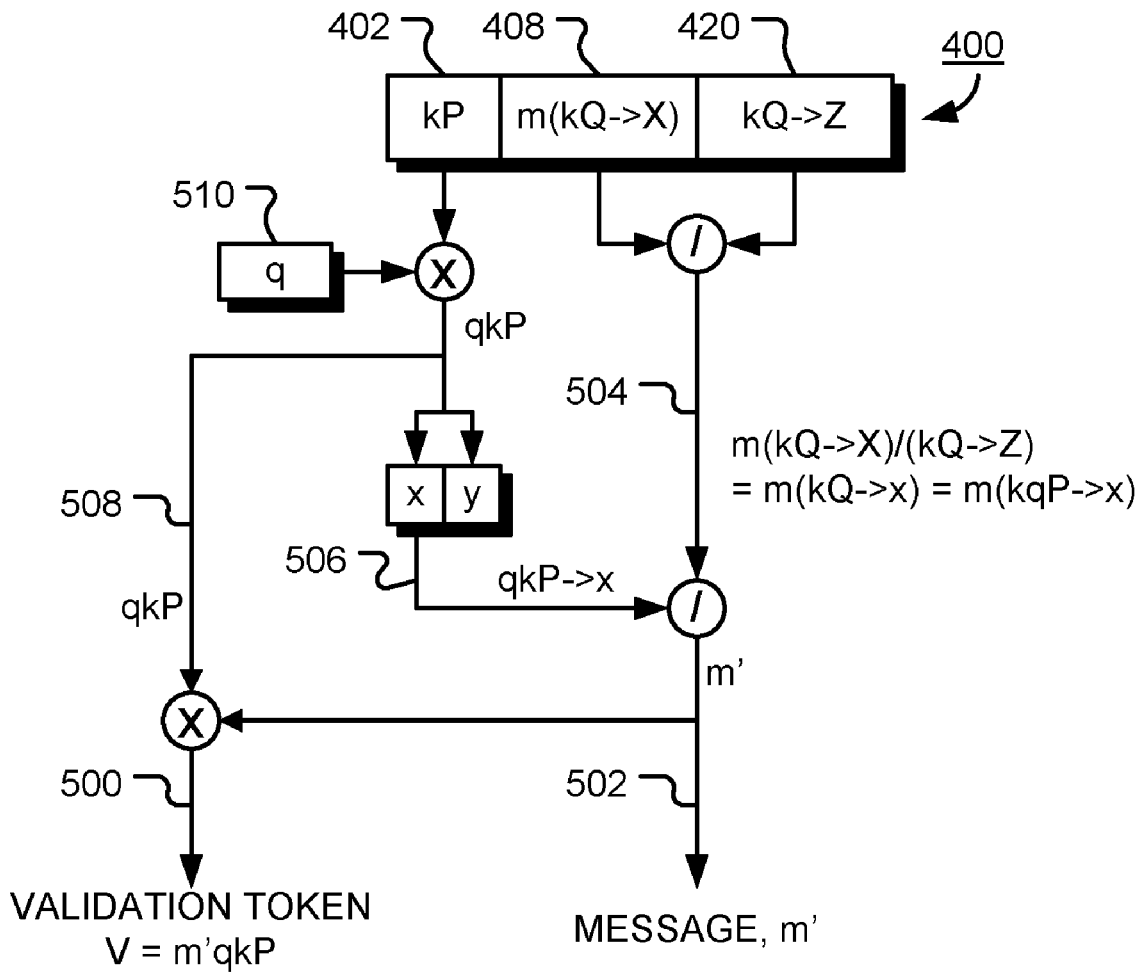
FIG. 5 is diagram showing generation of a validation token, V, consistent with certain embodiments of the invention, for validation of information transfer from a transmitter to a receiver.

FIG. 5 is a diagram showing generation of a validation token V (500), consistent with certain embodiments of the invention, for validation of information transfer between a transmitter (party A) and a receiver (party B). Referring to FIG. 5, the cipher 400 is decrypted to obtain a message m' (502). In the example shown in FIG. 5, projective coordinates are used. The second element 408 of the cipher 400 is divided by the third element 420 (the Z-coordinate of the product kQ) to give the affine x-coordinate 504 of the product m(kQ→x). Since Q=qP, mkQ=mkqP. As is well known to those of ordinary skill in the art, the division operation is equivalent to a multiplication by the multiplicative inverse. The affine x-coordinate 506 of the product qkP (508) is generated by multiplying the first element 402 of the cipher (kP) by the private key, q (510), of the receiver. The message m' (502) decoded from the cipher 400 is found by dividing the ciphertext quotient 504 of the second 408 and third 420 portions of the cipher by the affine x-coordinate of the product qkP (506). Finally, the validation token V (500) is calculated as the multiplication of the decoded message m' (502) with the product qkP (506).

The present invention, as described in embodiments herein, may be implemented using a programmed processor executing programming instructions that are broadly described above in flow chart form that can be stored on any suitable electronic storage medium. However, those skilled in the art will appreciate that the processes described above can be implemented in any number of variations and in many suitable programming languages without departing from the present invention. For example, the order of certain operations carried out can often be varied, additional operations can be added or operations can be deleted without departing from the invention. Error trapping, enhancements and variations can be added without departing from the present invention. Such variations are contemplated and considered equivalent.

The present invention could be implemented using special purpose hardware and/or dedicated processors. Similarly, general purpose computers, microprocessor based computers, digital signal processors, microcontrollers, dedicated processors, custom circuits, ASICS and/or dedicated hard wired logic may be used to construct alternative equivalent embodiments of the present invention.

Those skilled in the art will appreciate that the program steps and associated data used to implement the embodiments described above can be implemented using disc storage as well as other forms of storage, such as, for example, Read Only Memory (ROM) devices, Random Access Memory (RAM) devices, optical storage elements, magnetic storage elements, magneto-optical storage elements, flash memory and/or other equivalent storage technologies without departing from the present invention. Such alternative storage devices should be considered equivalents.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. A method for securely validating information exchange, the method performed by at least one processor, the method comprising:

generating a message m from information i;

generating a cipher comprising a first element including the product kP of a random value k and the elliptic curve point P, and a second element including the message m scrambled with the x-coordinate of the product kQ of the random value k and the elliptic curve point Q;

transmitting the cipher to a receiver;

receiving a validation token derived from the cipher, the validation token including a product m'qkP of a message m' decoded from the cipher, a private key q of the receiver, and the first element kP of the cipher, wherein the public key Q is equal to the product the private key q with the point P, wherein the x-coordinate of the point kQ on the elliptic curve is an affine coordinate, and wherein the message m' is equal to the unscrambling of the second element of the cipher with the x-coordinate of the product qkP of the private key q with the first element kP of the cipher; and validating the information exchange if the validation token comprises the product of the message m and the point kQ.

2. A method performed by at least one processor in accordance with claim 1, further comprising:

generating a second random number, r; and generating the message m from the information, the random number r and at least a portion of the x-coordinate of a point iP that is the product of the information to be sent to the receiver and the point P on the elliptic curve.

3. A method performed by at least one processor in accordance with claim 1, wherein validating communication of the information to the receiver comprises:

multiplying the affine x-coordinate of the validation token V by the projective Z-coordinate of the product mkQ to generate a first value;

multiplying the affine y-coordinate of the validation token V by the projective Z-coordinate of the product mkQ to generate a second value; and validating communication of the information to the receiver if the projective X-coordinate of the product mkQ is equal to the first value and the projective Y-coordinate of the product mkQ is equal to the second value.

4. A method performed by at least one processor in accordance with claim 1, wherein the x-coordinate of the product kQ comprises an affine coordinate.

5. A method performed by at least one processor in accordance with claim 1, further comprising computing the product kP and the product kQ using projective coordinates.

6. A method performed by at least one processor in accordance with claim 5, wherein the first value of the cipher comprises the projective X, Y, and Z coordinates of the point kP.

7. A method performed by at least one processor in accordance with claim 5, wherein the cipher further comprises the Z coordinate of the point kQ.

8. A method performed by at least one processor in accordance with claim 1, wherein the message m comprises:
a header;
a second random number, r;
at least a portion of the x-coordinate iP→x of a product of the information i being sent to the receiver with the point P; and
the information i to be transmitted.

9. A method performed by at least one processor in accordance with claim 1, wherein the cipher c comprises the message m scrambled with the x-coordinate of the product kQ.

10. A method of providing validation information in an information exchange, using an elliptic curve with a point P and a point Q that is the product of private key q and the point P, each point comprising at least an x- and a y-coordinate, the method performed by at least one processor, the method comprising:
receiving a cipher including a first cipher portion equal to a product kP of a first random number k with a point P on an elliptic curve, and a second cipher portion equal to a scrambling of message m with the x-coordinate of a point kQ on the elliptic curve, where Q is a public key;
multiplying the first portion of the cipher by the private key q, to get a point T on the elliptic curve;
unscrambling the second portion of the cipher using the x-coordinate of the point T to get a message m', wherein the message m' is equal to the product of the second portion of the cipher with the inverse of the x-coordinate of the point T;
generating a validation token V comprising the product m'T of m' and the point T, and
transmitting the validation token V to the sender for the sender's use in validating the information exchange if the validation token comprises the product of the message m and the point kQ.

11. A method performed by at least one processor in accordance with claim 10, wherein the cipher further comprises a third portion and the message m' is equal to the product of the second element of the cipher with the inverse of the third portion of the cipher and with the inverse of the affine x-coordinate of the point T.

12. A method performed by at least one processor in accordance with claim 10, wherein the message m' comprises a header portion, a scrambled information portion and an information portion, the method further comprising:
invalidating the message if the header portion of the message does not match a pre-determined header for the message; and
invalidating the message if the scrambled information portion of the message does not match at least a subset of the x-coordinate of the product of the information portion of the message and the point P;
wherein no validation token is generated if the message is invalidated.

13. A method performed by at least one processor in accordance with claim 12, further comprising invalidating the message if the information portion of the message does not match at least one value of a set of acceptable values.

14. A method performed by at least one processor in accordance with claim 13, wherein the set of acceptable values is further restricted to the values associated with the external credentials provided by the sender.

15. A method for validating secure exchange of information i, the method performed by at least one processor, the method comprising:
generating in the at least one processor a cipher, the cipher including a first cipher element equal to a product kP of a first random number k with a point P on an elliptic curve, and
a second cipher element equal to a scrambling of message m with the x-coordinate of a point kQ on the elliptic curve, where Q is a public key, and, wherein the message m comprises
a first message element dependent upon information i to be transmitted, and
a second message element comprising an arithmetically independent representation of information i to be transmitted;
transmitting by a transmitter the cipher; and
receiving by a receiver a validation token, the received validation token derived from the cipher, the validation token including a product m'qkP of a message m' decoded from the cipher, a private key q of the receiver, and the first element kP of the cipher, wherein the public key Q is equal to the product the private key q with the point P, wherein the x-coordinate of the point kQ on the elliptic curve is an affine coordinate and wherein the message m' is equal to the unscrambling of the second element of the cipher with the x-coordinate of the product qkP of the private key q with the first element kP of the cipher.

16. The method according to claim 15, wherein the first message element comprises the information i, and the second message element comprises at least a portion of the x-coordinate iP→x of the product iP of the information i and the point P on the elliptic curve.

17. The method according to claim 15, wherein the x-coordinate iP→x is a projective coordinate generated by a method known to both the transmitter and the receiver.

18. The method according to claim 15, wherein the message further comprises a fixed header and a second random value, r.

19. The method according to claim 15, wherein the message m comprises a one-byte header with a leading bit equal to zero, concatenated with at least a portion of the x-coordinate iP→x of the product of i and the point P, concatenated with a second random value r of at least half the field size, and further concatenated with the information i.

20. The method according to claim 15, wherein the x-coordinate kQ→x of the point kQ on the elliptic curve is a projective coordinate and wherein the cipher further comprises the projective Z-coordinate of the point kQ.

21. The method according to claim 20, wherein the message m' is equal to the product of the second element m(kQ→x) of the cipher with the inverse of the projective Z-coordinate of the point kQ and with the inverse of the affine x-coordinate of the product qkP of the private key q with the first element kP of the cipher.

* * * * *